(12) United States Patent
Newman

(10) Patent No.: US 12,242,640 B2
(45) Date of Patent: *Mar. 4, 2025

(54) SYSTEM OF MANAGING DATA ACROSS DISPARATE BLOCKCHAINS

(71) Applicant: Wells Fargo Bank, N.A., San Francisco, CA (US)

(72) Inventor: David Newman, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,615

(22) Filed: Dec. 8, 2023

(65) Prior Publication Data

US 2024/0104238 A1 Mar. 28, 2024

Related U.S. Application Data

(63) Continuation of application No. 17/302,097, filed on Apr. 23, 2021, now Pat. No. 11,874,947, which is a
(Continued)

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *G06Q 40/02* (2013.01); *G06Q 40/06* (2013.01)

(58) Field of Classification Search
CPC ... G06F 21/6227; G06F 21/602; G06F 19/322
See application file for complete search history.

(56) References Cited

U.S. PATENT DOCUMENTS

| 10,021,565 B2 | 7/2018 | Jones-Mcfadden et al. |
| 10,990,673 B1 | 4/2021 | Jiang et al. |

(Continued)

OTHER PUBLICATIONS

"U.S. Appl. No. 15/827,716, Final Office Action mailed Sep. 17, 2020".
"U.S. Appl. No. 15/827,716, Non Final Office Action mailed May 15, 2020".
"U.S. Appl. No. 15/827,716, Notice of Allowance mailed Jan. 6, 2021".
(Continued)

*Primary Examiner* — Paul E Callahan
(74) *Attorney, Agent, or Firm* — SCHWEGMAN LUNDBERG & WOESSNER, P.A.

(57) ABSTRACT

A method may include storing access rights with respect to a plurality of shared data ledgers, wherein each respective shared data ledger of the plurality of shared data ledgers comprises: a plurality of data portions; and at least one data record stored within a data portion of the plurality of data portions; receiving a request, from a requesting computing device, the request including: a requesting identifier stored in a data record of a first shared data ledger; and a request for information, associated with the requesting identifier, stored in a second shared data ledger; determining that the requesting computing device is authorized to access the information stored in the second shared data ledger based on the stored access rights; and based on the determining: accessing the information associated with the requesting identifier from the second shared data ledger; and transmitting at least a portion of the accessed information.

20 Claims, 8 Drawing Sheets

Related U.S. Application Data continuation of application No. 15/827,716, filed on Nov. 30, 2017, now Pat. No. 10,990,693.

(60) Provisional application No. 62/429,494, filed on Dec. 2, 2016.

(51) Int. Cl.
*G06Q 40/02* (2023.01)
*G06Q 40/06* (2012.01)

(56) References Cited

U.S. PATENT DOCUMENTS

| | | |
|---|---|---|
| 10,990,693 B1 | 4/2021 | Newman |
| 11,874,947 B1 * | 1/2024 | Newman ............. G06F 21/6227 |
| 2018/0060496 A1 | 3/2018 | Bulleit et al. |

OTHER PUBLICATIONS

"U.S. Appl. No. 15/827,716, Response filed Aug. 17, 2020 to Non Final Office Action mailed May 15, 2020".

"U.S. Appl. No. 15/827,716, Response filed Nov. 17, 2020 to Final Office Action mailed Sep. 17, 2020".

"U.S. Appl. No. 17/302,097, Non Final Office Action mailed May 11, 2023", 21 pgs.

"U.S. Appl. No. 17/302,097, Notice of Allowance mailed Sep. 13, 2023".

"U.S. Appl. No. 17/302,097, Response filed Aug. 10, 2023 to Non Final Office Action mailed May 11, 2023".

U.S. Appl. No. 15/827,716 U.S. Pat. No. 10,990,693, filed Nov. 30, 2017, System of Managing Data Across Disparate Blockchains.

U.S. Appl. No. 17/302,097, filed Apr. 23, 2021, System of Managing Data Across Disparate Blockchains.

* cited by examiner

SYSTEM OF MANAGING DATA ACROSS DISPARATE BLOCKCHAINS

CROSS-REFERENCE TO RELATED APPLICATION

This patent application is a continuation of U.S. patent application Ser. No. 17/302,097, filed Apr. 23, 2021, which is a continuation of U.S. patent application Ser. No. 15/827,716, filed Nov. 30, 2017, now issued as U.S. Pat. No. 10,990,693, which claims the benefit of U.S. Provisional Patent Application No. 62/429,494, filed Dec. 2, 2016, entitled "SYSTEM OF MANAGING DATA ACROSS DISPARATE BLOCKCHAINS", each of which are incorporated by reference herein in their entirety.

TECHNICAL FIELD

Embodiments described herein generally relate to data structure analysis and in particular, but without limitation, to managing data across disparate blockchains.

BACKGROUND

Different entities (e.g., companies, industries, lines of business within a company) often use different data types and data structures to store relevant data. One data type from a first entity may reference data from a second entity, which in turn references data from a third entity, and so on. There are many potential problems that may arise from this type of arrangement. For example, the first entity may not be authorized to access data from the third entity and thus must rely on the veracity of the information from the second entity. However, if the second entity has changed the data, the first entity has no way of verifying the data is valid.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 7 illustrates a flowchart of accessing data across multiple shared ledgers, according to various examples; and in which

DETAILED DESCRIPTION

Figure 1:
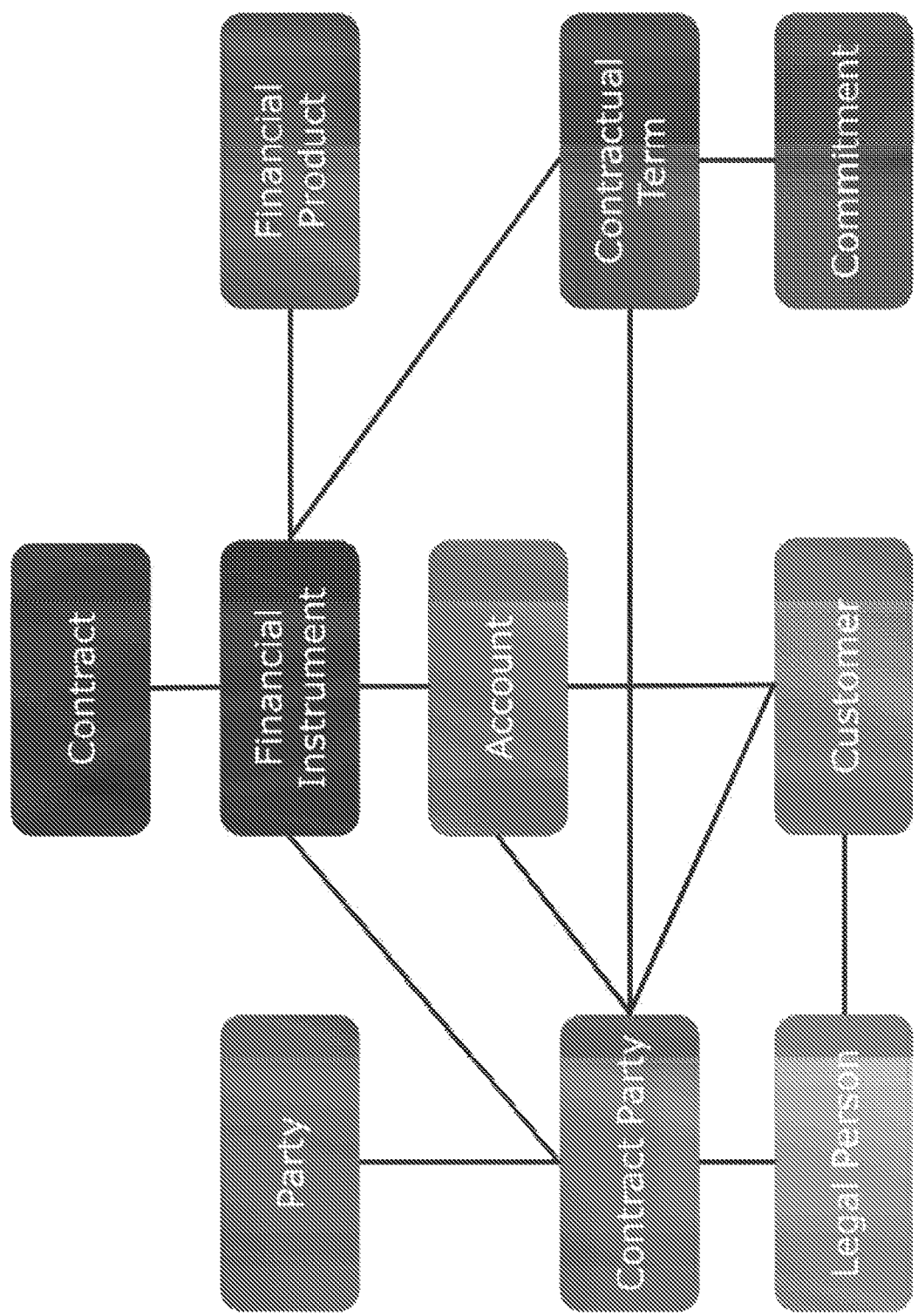
FIG. 1 is a diagram depicting relationships between objects that may be in a contract, according to various examples.

Computing decisions are often made by analyzing information and acting based on the results of the analysis. The more information available, the better the informed the decision, generally speaking. The information needed to make a decision is usually spread across multiple different computing platforms, which may lead to a variety of problems when accessing the information. For example, the information may be stored in different file systems, different file formats, subject to different privacy regulations, different encryption standards, etc.

As an illustration of some of these problems, consider a first company that needs to make a decision, which ideally is based on a set of data [A, B, C]. The first company may already know A, but could make a better informed decision if B and C were also known. Thus, the first company may request B and C from a second company. The second company may not have C, so it requests C from yet a third company. At this time, the first company may be in possession of A, B, and C but have no way of verifying that B and C are actually valid pieces of data.

This disclosure describes systems that facilitate the exchange of validated electronic data to help alleviate the problems described above. The systems are described in approximately three sections: ontology-based blockchain data, storing validated ontological data on the blockchains, and collecting and sharing data across blockchains to make a decision. Initially, an overview of blockchain technology is presented.

The use of the phrase blockchain technology generally means the collection of programming paradigms permitting a shared ledger of data that is not alterable once the data has been added to the ledger. One of the most common uses of blockchains of is the Bitcoin cryptocurrency. The Bitcoin blockchain uses Merkel trees, cryptocurrency as reward for calculating a "proof of work," decentralized control, and consensus computing. However, these are not required for a blockchain to exist.

In a basic form, a blockchain may be conceptualized as series of data blocks, each data block including one or more data entries. For example, real estate transactions may be stored as data entries and grouped together in a block with the block having a unique identifier. Each data entry may have a timestamp as well, so the order of the transactions may be determined. The next block in the chain may include a hash of the data entries in the previous block. Thus, if someone wanted to alter the information in the blockchain it would be easily detected because the hashes in later blocks will no longer match. The next portion of this disclosure describes how an ontology may be used to standardize data that ultimately may be stored in a blockchain.

An ontology generally means a taxonomy of objects for a given field, and different fields may use different ontologies. An ontology may identify types, properties, and interrelationships between the objects. When used in the electronic realm, an ontology may be used to determine if data complies with the ontology. In some examples, an ontology may be described a schema.

As a simple example, consider a schema for a Person object. The schema may include a number of entries that define the properties of a Person object such as "given name," "height," "weight," etc., and the properties may also have expected types. Thus, the "height" property may have a quantitative type where as "given name" may be text. The accepted type of an object may be another object such as a property of "knows" having an expected type of Person.

Accordingly, the data string "Alice knows Bob" can be thought of as two Person objects with the Alice having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to our example Person schema, the predicate is the property in the schema and the expected type is the object. In other words, a schema may semantically define valid relationships between multiple objects.

As another example, consider FIG. 1 depicting relationships between objects that may be in a contract. Industry groups may promulgate schemas/ontologies for use by their members or for communicating with their members. For example, the Financial Industry Business Ontology (FIBO™) identifies numerous objects and their semantically defined relationships common in the financial industry-such as depicted in FIG. 1. While the majority of this disclosure is focused on financial terms and use cases, the same methods can be applied to any industry (e.g., retail, health care, etc.).

Figure 2:
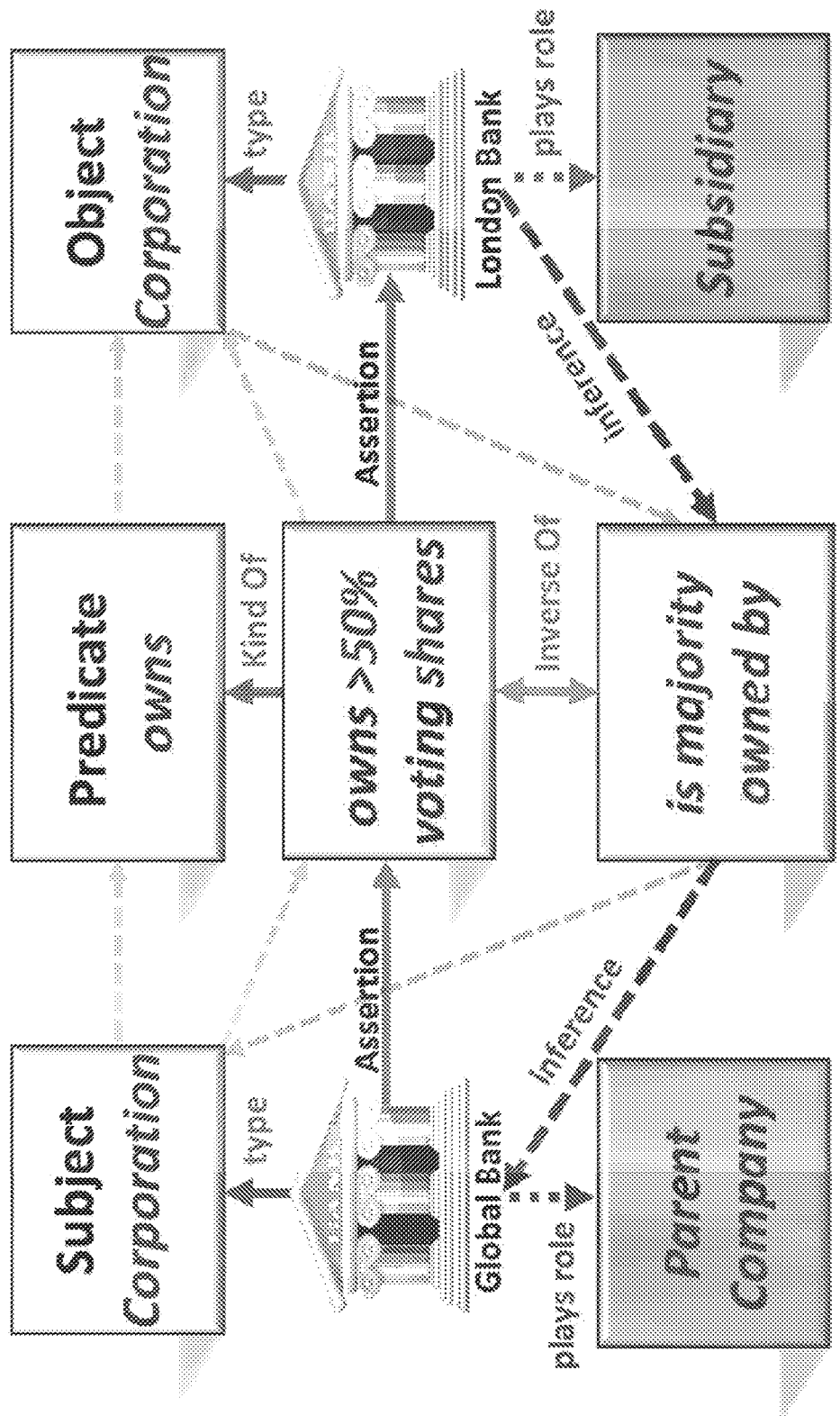
FIG. 2 is a semantic representation of a sentence, according to various examples.

FIG. 2 illustrates the concept of "Corporate Ownership" as used in a semantic ontology, according to an example. The example uses the S-P-O format discussed above. One flexibility of a semantic ontology is that data from any number of sources may be standardized and harmonized. Accordingly, once a data store (e.g., file system, relational database, NoSQL database, flat file database) is populated with enough semantically intact data, the data may be mined, stored, queried, audited, and validated. The data may originate in a number of forms such as unstructured data, a spreadsheet, a relational database, Extensible Markup Language (XML), JavaSript Object Notation, etc.

In some instances, a service (e.g., a web service) may map or translate the various formats into a common format for easier data mining. For example, a webpage may include the unstructured data "Global Bank owns >50% voting shares of London Bank." This data may be parsed into the S-P-O format of subject: Global Bank; predicate: owns; and object: London Bank. At this point, the service may update a database to indicate the relationship between Global Bank and London Bank according to a defined schema.

Regulators, or other users, may use this information when analyzing more complex transactions. For example, after enough data has been inputted into a data store, regulators— as well as financial institutions—may quickly perform systemic risk analysis or compliance with regulation W. Other use cases may be readily apparent to a person of ordinary skill in the art without departing from the scope of this disclosure and may vary depending on the technology area.

Problems may arise when large amounts of data is assumed to be compliant with an ontology but fails to meet the requirements of the ontology. In various examples, a web service may be provided that validates data according to a known schema and provides a digital compliance signature indicating the data is valid.

Figure 3:
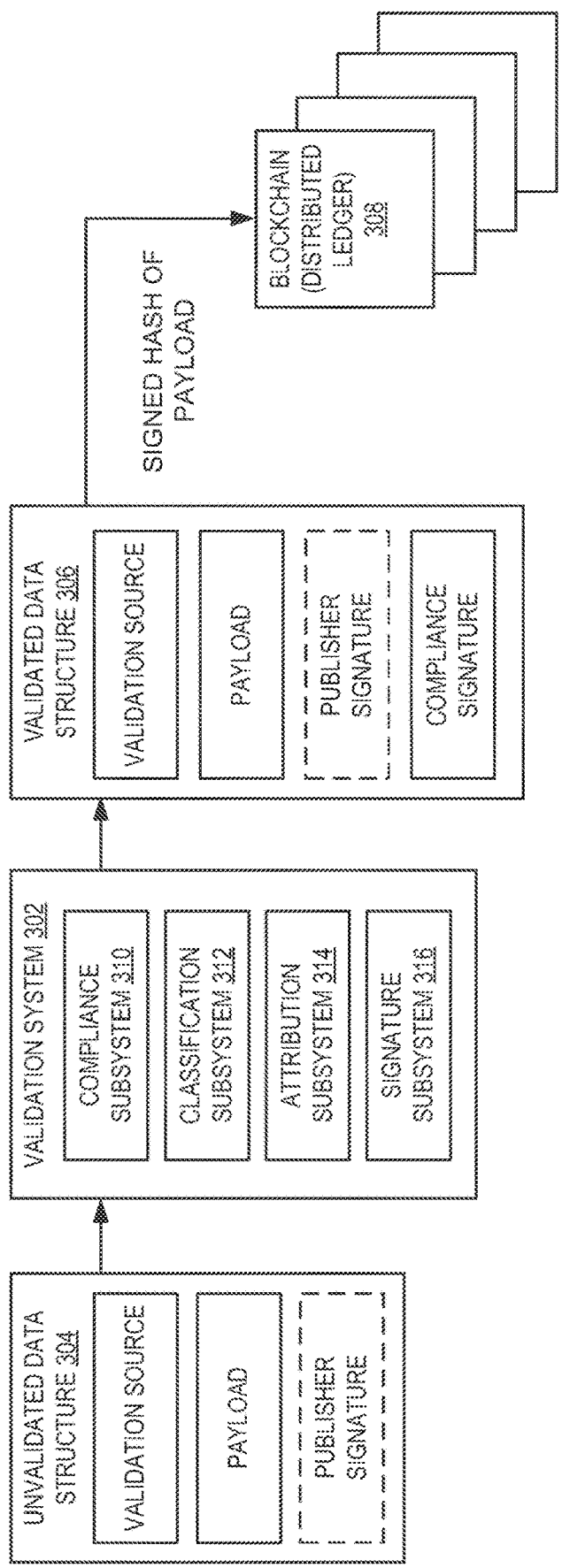
FIG. 3 illustrates a schematic diagram of validating a data structure, according to various examples.

FIG. 3 illustrates a schematic diagram 300 of validating a data structure, according to various example embodiments. The diagram 300 illustrates validating system 302, unvalidated data structure 304, validated data structure 306, and blockchain 308. The validating system 302 includes compliance subsystem 310, classification subsystem 312, attribution subsystem 314, and signature subsystem 316, according to various examples.

In various examples, the servers and components of the diagram 300 may communicate via one or more networks (not shown). The networks may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The networks may include a single local area network (LAN) or wide-area network (WAN), or combinations of LAN's or WAN's, such as the Internet.

The validating system 302 may provide an Application Programming Interface (API) to publishers of a transaction. A publisher may be any entity that wants to have data validated against an ontology. Within the financial industry, a publisher may be a financial institution such as a bank, corporation, brokerage, closing company, etc. A transaction may be a set of data that defines one or more properties of an entity within an ontology. For convenience, FIG. 3 will be discussed as an interest rate swap between two banks.

Figure 4:
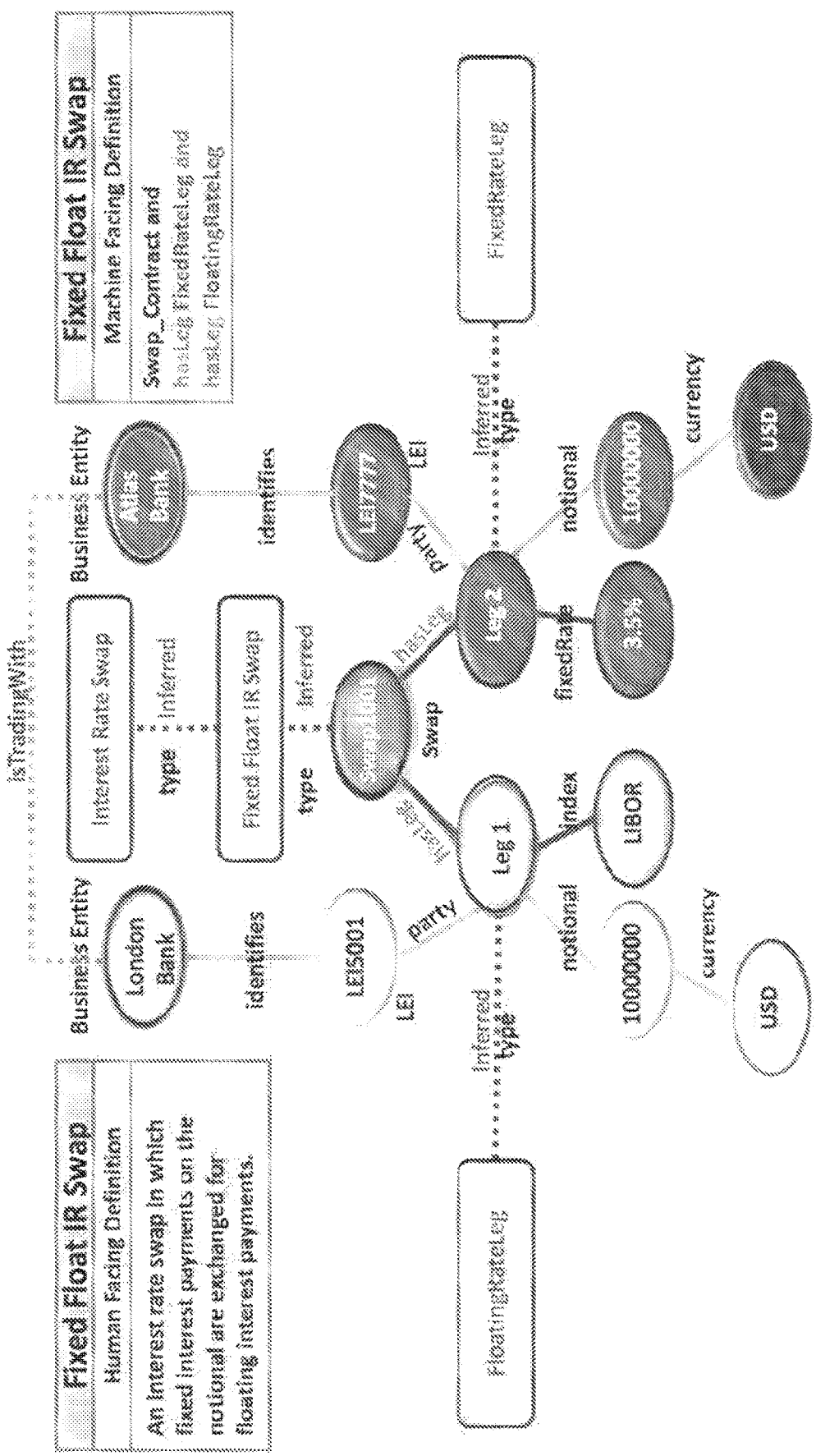
FIG. 4 is a diagram illustrating a semantic representation of an interest rate swap, according to various examples.

FIG. 4 is a diagram illustrating a semantic representation of an interest rate swap, according to various examples. In order to have the interest rate swap considered valid by other sources, the interest rate swap may be encapsulated into a format for validation by the validating system 302. Examples of encapsulation formats include, but are not limited to, XML and JavaScript Object Notation-Linked Data (JSON-LD). An addition component of JSON-LD is the identification of a schema that the payload of the JSON-LD is supposed to adhere to (referred to as the validation source in FIG. 3)

For example, the following JSON-LD encoding may be used for a swap contract such as displayed in FIG. 4:

```
{
"@context" : {
"@vocab" : "http://spec.edmcouncil.org/fibo/Swaps/"
},
"@type" : "SwapContract",
"hasIdentifier" : "Swap1001",
"hasSwapStream" : [
{ "@type" : "SwapStream",
"hasPayerParty" : { "@type "Party",
"hasLegalEntityIdentifier" : "LEI5001"},
"hasRate" : "0.05" },],
"hasSwapStream" : [
{ "@type" : "SwapStream".
"hasPayerParty" : { "@type "Party",
"hasLegalEntityIdentifier" : "LEI7777"},
"hasFloatingRateIndex" : { "@type "RateIndex",
"hasIdentifier" : "LIBOR" },]
}
```

The validating system 302 may include at least one web server to respond to API calls from publishers of data, such as unvalidated data structure 304. The validating system 302 may also include at least one processor to execute subsystems 310-316. The execution of the subsystems may take place in one physical computing device or be distributed across multiple computing devices. In some instances, more than one computing device completes the same task (e.g., first to complete). The computing devices may be located in one geographic area or distributed across multiple geographic areas.

In an example, the compliance subsystem 310 compares the payload of unvalidated data structure 304 to a schema as defined by the validation source. Validating may include retrieving the rules for the various entities in the payload checking for their compliance. For example, the schema may indicate that the type "SwapContract" requires two "Party" types. If the payload fails to include two parties, the unvalidated data structure 304 would be rejected as failing to comply with the schema and not added to a blockchain. In an example, the compliance subsystem 310 calls a third-party service to check the payload for validation.

The classification subsystem 312 may modify the payload if additional classifications of objects can be inferred by data in the payload. Using the example above, the JSON-LD states the first type is that of a "SwapContract" with one leg having a "hasRate" type and the second leg having a "FloatingRateIndex" type. The schema identified in the validation source may indicate that a SwapContract that includes the "hasRate" type and the "FloatingRateIndex" type is properly classified as a "FixedFloatInterestRateSwapContact." Accordingly, classification subsystem 312 may modify "SwapContract" to "FixedFloatInterestRateSwapContact."

In some instances, a data structure examined by validating system 302 includes a digital signature of the publisher. The digital signature may be a hash of the payload (or of the payload and validation source) encrypted using the private key of the publisher. The attribution subsystem 314 may retrieve the public key—either included with the JSON-LD message or from a registry—of the publisher to decode the hash of the payload. The attribution subsystem 314 may also create a hash of the payload which is compared with the decoded hash. If the two hashes match, the publisher may be considered verified. Other types of attribution techniques may be used without departing from the scope of this disclosure.

If both the compliance subsystem 310 and attribution subsystem 314 indicate the payload complies with the schema, and is properly attributable to the publisher, the signature subsystem 316 may attach a compliance signature to the unvalidated data structure 304 to create validated data structure 306. The compliance signature may be based a hash the payload and optionally the validator source and publisher signature. The hash may be signed using the private key of the validating system 302. The validated data structure 306 represents an example format of a compliance signed data structure.

After a compliance signature has been added to a data structure, the validated data structure 306 may be added to a blockchain. In some instances, the payload is not included in the blockchain, but only signed hashes of the payload. The blockchain may include all the previous swap contracts; although the blockchain may not be limited to only swap contracts. Accordingly, anyone with the blockchain may trust another party that indicates the swap contract described in the example above is valid based on the signed hash or signed payload outputted by validating system 302.

In some instances, adding the validated data structure 306 to the blockchain is accomplished by distributing the validated data structure 306 to numerous anonymous servers. The servers may need to complete a computationally difficult calculation in order to add validated data structure 306 to the blockchain. The calculation may require using a hash of previously added information to the blockchain. In such as a manner, the blockchain becomes difficult to improperly modify. Once added, the blockchain may be trusted by other parties despite the anonymous nature of the servers.

For example, similarly to how attribution subsystem 314 determines a valid publisher, a party could take the public key of validating system 302 to decode the compliance signature, resulting in the hash of the payload. The party could independently calculate the hash of the payload and compared to the decoded hash. If the hashes match, the party can know that the transaction in the payload is valid and attributable to the publisher. As indicated above, in some instance the compliance signature does not include the publisher signature in the hash. Thus, in some instances, blockchain includes the payload signed by both the publisher and the validating system 302.

Figure 5:
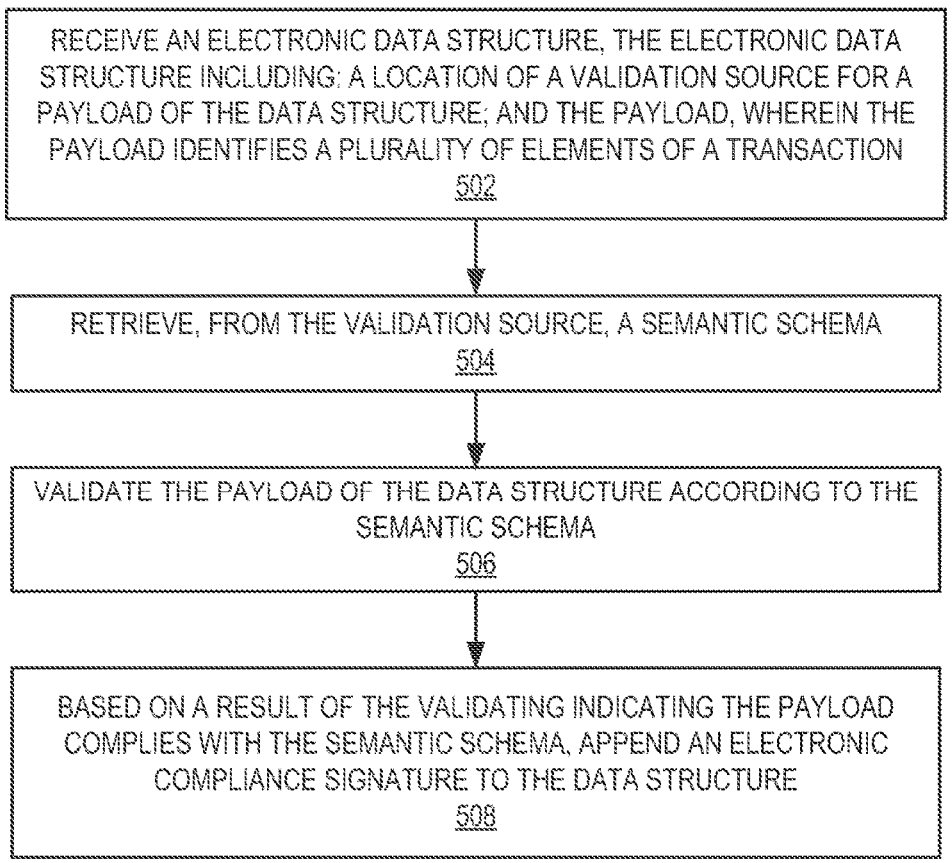
FIG. 5 illustrates a flowchart of a method of adding a compliance signature to a data structure, according to various examples.

FIG. 5 illustrates a flowchart of method of adding a compliance signature to a data structure. The method may be performed by executing, using at least one processor, instructions stored on a non-transitory computer-readable medium.

At operation 502, an electronic data structure may be received. The electronic data structure may include a location of a validation source for a payload of the data structure. The location may be a uniform resource identifier that links to a semantic schema. The semantic schema may be retrieved (operation 504). The semantic schema may identify rules such as names of object types (also referred to an elements), properties of object types, valid values for the properties, restriction on operations of object types with respect to other object types, among other things.

The data structure may also include a payload. The payload may identify at least one object type, a property of the object, and a value for the property. Multiple objects may be included in the data structure as well multiple different object types. In an example, the electronic data structure conforms to the JSON-LD format. The data structure may also include a digital signature of the publisher of the electronic data structure.

At operation 506, the data structure may be validated according to the semantic schema. The rules of the semantic schema may be compared to the elements of the data structure for validation. For example, properties included in the data structure may be compared to valid properties according to the schema. Similarly, the values for the properties may be compared to the valid values for the properties.

An element of the payload may be modified based on the schema. For example, the schema may identify a hierarchy of elements (parent/child, genus/species, etc.). The data structure may identify a genus object but an examination of the properties of the genus object may be used to infer the genus could only be one of the species objects. Thus, the genus object may be altered to the species.

At operation 508, based on a result of the validating indicating the payload complies with the semantic schema, an electronic compliance signature may be appended to the data structure. The payload may be hashed and encrypted using a private key to create the electronic compliance signature. Additionally, a blockchain that includes at least one block with at least one transaction may be retrieved. The hashed payload signed by the electronic compliance signature may be appended to the blockchain. In an example, the payload with the compliance signature is appended to the block chain instead of (or in addition to) a hashed version of the payload.

Different version of the payload may be appended to the blockchain. For example, when the payload is modified as above, two versions of the payload may be appended to the blockchain: one hashed payload with the changes and one hashed payload without the changes. The hashes may be signed as indicated above. Additionally, sometimes the hash may include the digital signature of the publisher and other times the hash may be created without the digital signature.

The use of ontology validated data stored in blockchains may allow organizations to trust that the data used in decision making is valid and has not-been tampered with.

Different organizations may use different types of blockchains. Generally speaking there are two types of blockchains: public and private. While the precise definitions of these terms may vary, they generally include variants of the following.

For example, a public, non-permissioned blockchain is one in which anyone may read or may request transactions be added to the blockchain. This type of blockchain generally includes no centralized management due to its open nature. The Bitcoin blockchain is an example of a public, non-permissioned blockchain. Another feature often associated with public, non-permission blockchains is anonymity—although there is no requirement that transactions on a public, non-permissioned block remain anonymous.

A private, non-permissioned blockchain may be a blockchain in which write access to the blockchain is limited to a set of computers, such as those within an organization. However, because the blockchain is non-permissioned, anyone may request that data be added to the blockchain—the data however should still be added by the limited set of computer. Accordingly, trust issues that arise in public blockchain may be avoided with respect to fraudulent attempts at manipulation the blockchain because the limited set of computers should have been prescreened.

Permissioned blockchain variants of the above may limit user's read/write access to a blockchain. For example, a permissioned public blockchain may allow anyone to read the blockchain, but restrict write access to a limited set of users. When computing a block, a computing device may check for credentials (e.g., an access code, or username and password combination) before permitting data to be added to the blockchain. Similar restrictions may be used for private blockchains.

The access rights may also be established using encryption. In other words, in a public blockchain all the data may be public, but be encrypted. Thus, in order for and entity to read the data, it would have to possess a decryption key. Different types of encryption may be used, as one of ordinary skill in the art would recognize.

Figure 6:
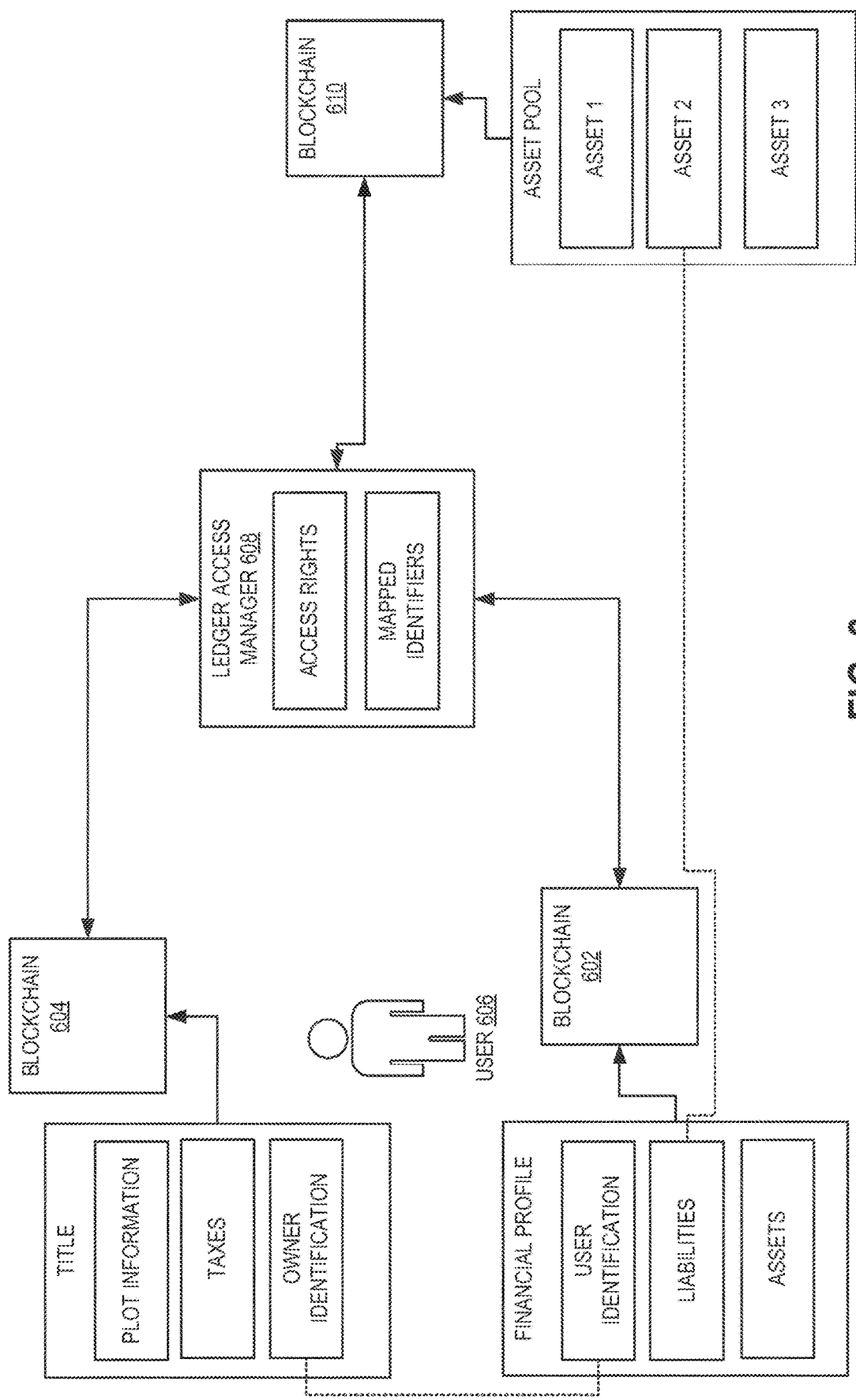
FIG. 6 is an illustration of multiple blockchains, according to various examples.

FIG. 6 is an illustration of multiple blockchains, according to various examples. FIG. 6 includes borrower blockchain 602, title blockchain 604, user 606, ledger access manager 608, and asset pool blockchain 610. Although not illustrated, the components in FIG. 6 may communicate with one another via one or more networks. The networks may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The networks may include a single local area network (LAN) or wide-area network (WAN), or combinations of LAN's or WAN's, such as the Internet.

Borrower blockchain 602 may be a permissioned, public blockchain. The borrower blockchain 602 may include data associated with assets and liabilities of user 606. User 606 may be identified within blockchain 602 by an identifier, such as an alphanumeric sequence of characters. This identifier may be used for each entry in the blockchain 602 associated with an asset of the user 606. In some instances, a user may need to register before being permitted to submit data for inclusion on the blockchain 602.

The data on the blockchain 602 may include identifications of the asset, current encumbrances on the asset, if any, amount borrowed, the entity the funds were borrowed from, etc. Multiple entries may be made for each asset. For example, once the borrowed funds for an asset have been repaid, an entry may be made in the blockchain 602 to this effect. This entry may also reference the identification of the asset as described above. In some instances, the entries in the blockchain 602 are encrypted using a private key of the user 606.

The user 606 may wish to restrict access to the underlying data. Thus, an access level (e.g., a range of 1 to 5) may be associated for some or all entries in the blockchain 602. For example, user 606 may wish to restrict the precise amount borrowed, for an asset, to lenders that the user 606 is already currently engaged with. In other cases, user 606 may be comfortable with allowing other entities to know that the user 606 owns the asset. Accordingly, a higher access level (e.g., 4 or 5) may be used for a current checking account balance, whereas a lower access level (e.g., 1 or 2) may be set for knowing that the user 606 has an account.

The blockchain 602 may also include general financial health entries associated with the user 606. For example, the credit score of the user 606, demographic information such as age, gender, occupation, current address etc., may also be stored on the blockchain 602. As with asset information, an access level may be established for each piece of information associated with the user 606.

To enter data into the blockchain 602, the user 606 may visit a website, use an application on the user's phone, or personal computer, etc. to manually enter in the information described above. The data may be transmitted to one or more of the servers that are permitted to add data to the blockchain 602 (e.g., permissioned servers). In some instances, the website etc., may be maintained by one of these same servers. In other examples, an automated process may be used by which the lender submits the entry to the blockchain 602. A combination of these processes may also be used to permit the encryption of the information by the user 606. Thus, a server computing device a format the information to be submitted to the blockchain, but the encryption may take place on a computing device of the user 606—as the private key should not be made available outside of the user 606. In an example, the data is formatted, signed, and validated as described in FIGS. 3 and 5.

Title blockchain 604 may be an un-permissioned public blockchain. Blockchain 604 may include identifications of the current and past titleholders of property. The blockchain 604 may also include details such as taxes due. The identifications of the property within blockchain 604 may be the same identifications used within blockchain 602. For example, an entity having access (e.g., a proper access level) to the property identification data within the blockchain 602 may query blockchain 604 using the identification data to obtain additional details about a property asset.

Government agencies may add to data within blockchain 604 in order to create an immutable record of property. This may, for example, allow an entity to query the blockchain 604 to obtain the complete history of a piece of property. This may allow an efficient use of computing resources to quickly clear questions regarding encumbrances upon a property. Every year, a new entry may be created for a piece of property with the updated taxes, valuation, etc.

Another layer of data security may be established for the entries in the blockchain 602 using the ledger access manager 608. This may be helpful because, despite encrypting the data entries in blockchain 602, any entity with the user's 606 public key, which may be readily available, may decrypt such entries. Thus, although the decrypting entity may be assured that the data originates from the user 606, user 606 has not prevented anyone from reading data that has a high access level setting.

To help alleviate this problem, entries in blockchains e.g., (blockchains 602 and/or 604) may further be encrypted using the public key of the ledger access manager 608. Although not illustrated, a public-private key infrastructure may be utilized for the sharing and distribution of keys (e.g. using certificate authorities, SSL, etc.) as is known to one having ordinary skill in the art. Consequently, an entity that wishes to read data on blockchain 602 may first need to request the data from the ledger access manager 608.

The ledger access manager 608 may perform a variety of functions related to retrieval and securing of data among multiple shared ledgers such as blockchains. These functions may include anonymization of data stored on blockchains, storing access rights for users, and obtaining details of information referenced in one blockchain that is stored in a second blockchain.

With respect to anonymization, a data structure (e.g., a map) may be stored in a storage device of a computing device associated with ledger access manager 608. The map may pair a random identifier and a stored identifier on a blockchain. For example, consider that a user permits access to the complete financial picture of the user for risk management purposes as they relate to investments of pools of mortgages etc. However, the user does not wish to be personally identified. The ledger access manager 608 may generate (e.g., randomly) another identifier that may be placed in other blockchains (e.g., blockchain 610) that is used in place of the user identifier in blockchain 602, for example. Thus, the data structure map may link the generated identifier with the user identifier (e.g., [user identifier, generated identifier]).

Accordingly, if an entity is examining blockchain 610 and wants to know more information about the assets included in a pool, the identifier in blockchain 610 may be provided to the ledger access manager 608 (e.g., using an API). The ledger access manager 608 may query the data structure map to obtain the original user identifier. The original user identifier may then be used to retrieve the data from blockchain 602, which may be in turn passed back to the entity.

With reference back to the access levels discussed with respect to blockchain 602, the ledger access manager 608 may manage which entities are permitted to access the data associated with each access level. For example, user 606 may, using a website provided by ledger access manager 608, access an interface that allows the user to select which types of entities are associated with each access level. Thus, a credit card company may only be able to access up to level 3, whereas a lender may be able to access up to level 5. In an example, specific entities may be associated with each access level. Accordingly, temporary access may be given to an entity that the user 606 is currently working with to obtain a loan and may be revoked later.

Figure 7:
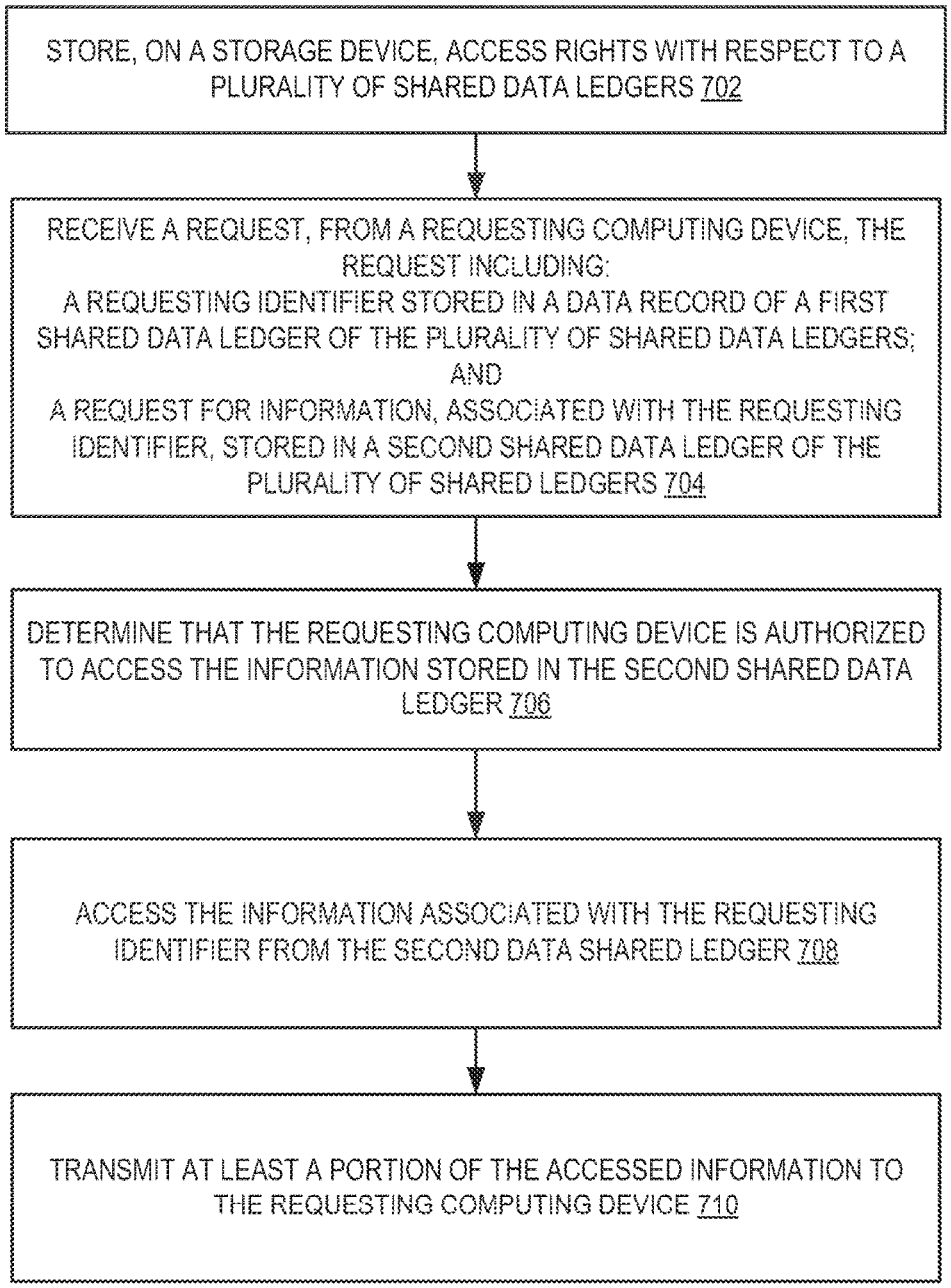

FIG. 7 illustrates a flowchart of accessing data across multiple shared ledgers, according to various examples. The method may be performed using the components (e.g., ledger access manager 608) described previously, in an example. For example, machine readable code may be run on a processor of an executing computing device to perform the methodology described in FIG. 7.

At operation 702, in an example, access rights with respect to a plurality of shared data ledgers are stored on a storage device. The storage device may be part of the executing computing device. The access rights may include a level of access for entities requesting data on one or more of the shared data ledgers. The access rights may further be associated with a user identifier. The user identifier may be part of credentials used by the user to alter the access rights. The access rights may be altered by the user navigating to a webpage provided by the executing computing device, in which the user enters user's credentials. A shared data ledger may include a plurality of data portions (e.g., a block) in which at least one data record is stored within a data portion.

At operation 704, in an example, a request may be received from a requesting computing device. The request may include a requesting identifier stored in a data record of a first shared data ledger of the plurality of shared data ledgers. The request may further include a request for information, associated with the requesting identifier, stored in a second shared data ledger of the plurality of shared ledgers. The requesting identifier may be in alphanumerical character string. The request may be received as part of an API call received at the executing computing device. The request for information may be a variable of the API call (e.g., [identifier, request for identification]).

At operation 706, in an example, it is determined that the requesting computing device is authorized to access the information stored in the second shared data ledger. This determination may be made by querying access rights that are stored on the executing computing device. The query may include identification of the entity that has requested the information. The entity identification may also be part of the API call. The entity identification may be used as part of the query to the access rights.

At operation 708, the information associated with requesting identifier from the second shared data ledger is accessed. In some examples, correlation data is accessed they correlates identifiers in the first shared data ledger to identifiers in the second shared data ledger. This correlation data may be stored in a data structure map as described above. The correlation data may be used to translate the requesting identifier to a second identifier. Accessing the information associated with the requesting identifier may include querying the second shared data ledger using the second identifier. Querying may include traversing a blockchain.

The information received as a result of the query may include data content (e.g. the requested information), as well as access levels associated with, a plurality of data records. The access levels may be compared to the rights granted to the requesting entity according to the stored access rights. Depending on the results of this comparison, at operation 710, at least a portion of the accessed information is transmitted to the requesting computing device.

In some example, the accessed information is encrypted using the public key of the ledger access manager. The ledger access manager may decrypt the information using the private key of the ledger access manager before transmitting the information to the requesting device. In some example, the decrypted data is encrypted with the public key associated with the requesting device (e.g., a domain) before transmission to the requesting device.

In some examples, the information associated with requesting identifier includes a third identifier. For example, one blockchain may be a series of mortgage-backed securities, which may in turn reference, a mortgage pool blockchain, which itself may reference a title blockchain. Thus, the steps of determining access rights inquiry and querying may be repeated for a third shared data ledger using the third identifier.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
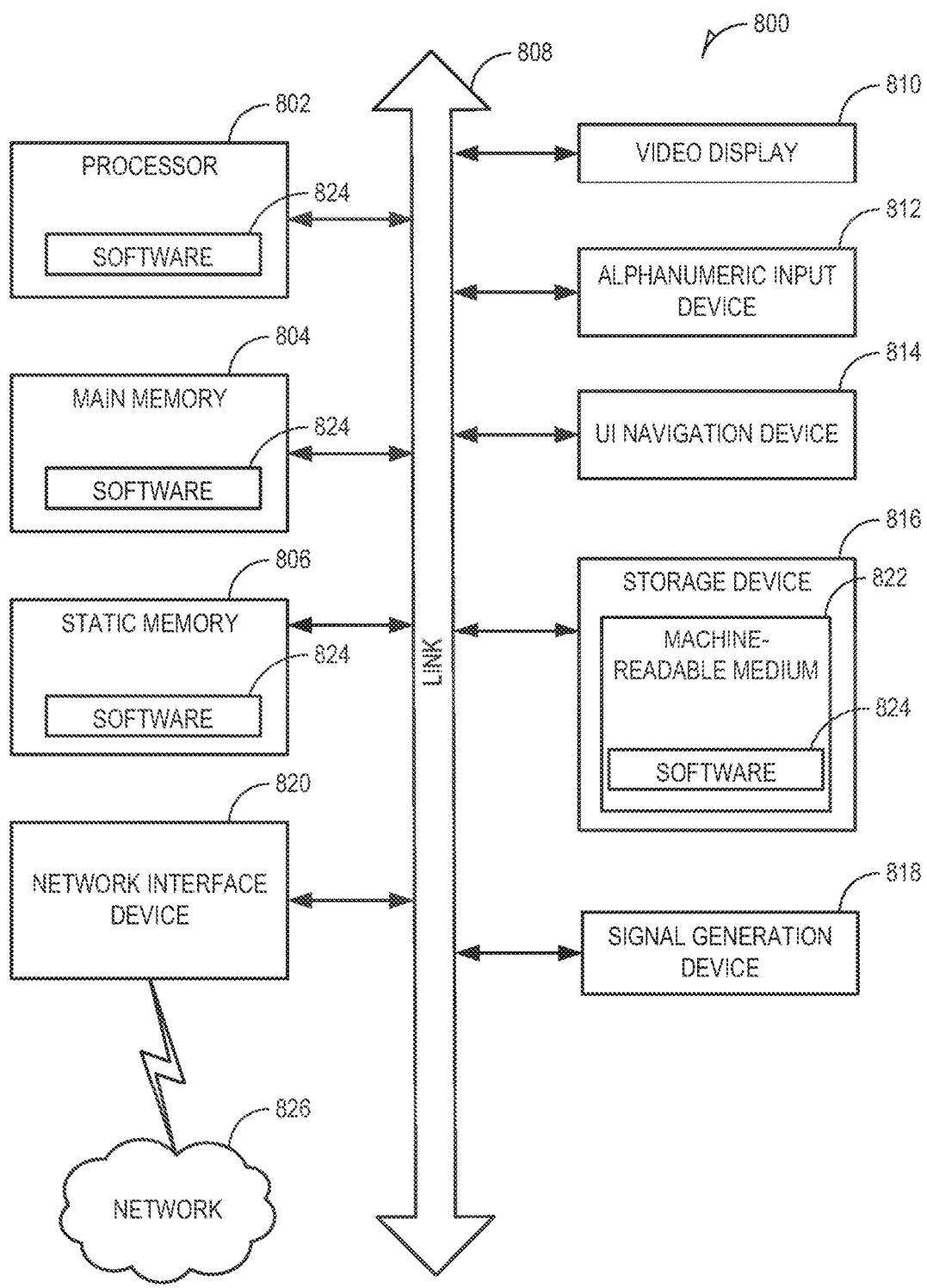
FIG. 8 is a block diagram illustrating an example machine upon which any one or more of the techniques (e.g., methodologies) discussed herein may be performed, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving an application programming interface (API) call from a requesting computing device, the API call including as parameters:
      a requesting identifier; and
      a request for information associated with the requesting identifier;
   processing the parameters of the API call to determine that the requesting computing device is authorized to access the requested information based on stored access rights;
   in response to determining that the requesting computing device is authorized to access the requested information, using the requesting identifier to access correlation data that correlates identifiers between a first shared data ledger and a second shared data ledger;
   translating the requesting identifier to a second identifier using the correlation data;
   querying the second shared data ledger using the second identifier to access the requested information; and
   transmitting at least a portion of the accessed information to the requesting computing device.

2. The method of claim 1, wherein the API call is received over a network interface.

3. The method of claim 1, wherein processing the parameters includes assessing an access level assigned to a requesting entity associated with the requesting computing device.

4. The method of claim 1, wherein translating the requesting identifier comprises looking up the requesting identifier in a data structure map.

5. The method of claim 1, wherein the accessed information associated with the requesting identifier includes a third identifier associated with a third shared data ledger.

6. The method of claim 5, further comprising:
   using the third identifier to determine access rights associated with the third shared data ledger; and
   determining whether the requesting computing device has access to the third shared data ledger based on the determined access rights.

7. The method of claim 3, wherein higher access level values indicate more restricted access.

8. A system comprising:
   at least one processor, and
   a storage device comprising instructions, which when executed by the at least one processor, configure the at least one processor to perform operations comprising:
      receiving an application programming interface (API) call from a requesting computing device, the API call including as parameters:
         a requesting identifier; and
         a request for information associated with the requesting identifier;
      processing the parameters of the API call to determine that the requesting computing device is authorized to access the requested information based on stored access rights;
      in response to determining that the requesting computing device is authorized to access the requested information, using the requesting identifier to access correlation data that correlates identifiers between a first shared data ledger and a second shared data ledger;
      translating the requesting identifier to a second identifier using the correlation data;
      querying the second shared data ledger using the second identifier to access the requested information; and
      transmitting at least a portion of the accessed information to the requesting computing device.

9. The system of claim 8, wherein the API call is received over a network interface.

10. The system of claim 8, wherein processing the parameters includes assessing an access level assigned to a requesting entity associated with the requesting computing device.

11. The system of claim 8, wherein translating the requesting identifier comprises looking up the requesting identifier in a data structure map.

12. The system of claim 8, wherein the accessed information associated with the requesting identifier includes a third identifier associated with a third shared data ledger.

13. The system of claim 12, the operations further comprising:
   using the third identifier to determine access rights associated with the third shared data ledger; and
   determining whether the requesting computing device has access to the third shared data ledger based on the determined access rights.

14. The system of claim 10, wherein higher access level values indicate more restricted access.

15. A non-transitory computer-readable medium comprising instructions, which when executed by at least one processor, configure the at least one processor to perform operations comprising:
   receiving an application programming interface (API) call from a requesting computing device, the API call including as parameters:
      a requesting identifier; and
      a request for information associated with the requesting identifier;
   processing the parameters of the API call to determine that the requesting computing device is authorized to access the requested information based on stored access rights;
   in response to determining that the requesting computing device is authorized to access the requested information, using the requesting identifier to access correlation data that correlates identifiers between a first shared data ledger and a second shared data ledger;
   translating the requesting identifier to a second identifier using the correlation data;
   querying the second shared data ledger using the second identifier to access the requested information; and transmitting at least a portion of the accessed information to the requesting computing device.

16. The non-transitory computer-readable medium of claim 15, wherein the API call is received over a network interface.

17. The non-transitory computer-readable medium of claim 15, wherein processing the parameters includes assessing an access level assigned to a requesting entity associated with the requesting computing device.

18. The non-transitory computer-readable medium of claim 15, wherein translating the requesting identifier comprises looking up the requesting identifier in a data structure map.

19. The non-transitory computer-readable medium of claim 15, wherein the accessed information associated with the requesting identifier includes a third identifier associated with a third shared data ledger.

20. The non-transitory computer-readable medium of claim 19, the operations further comprising:
   using the third identifier to determine access rights associated with the third shared data ledger; and
   determining whether the requesting computing device has access to the third shared data ledger based on the determined access rights.

* * * * *